H. C. HARTLINE.
TRACTOR.
APPLICATION FILED MAY 25, 1916.

1,245,715.

Patented Nov. 6, 1917.
2 SHEETS—SHEET 1.

WITNESSES

INVENTOR
H. C. Hartline
BY
ATTORNEYS

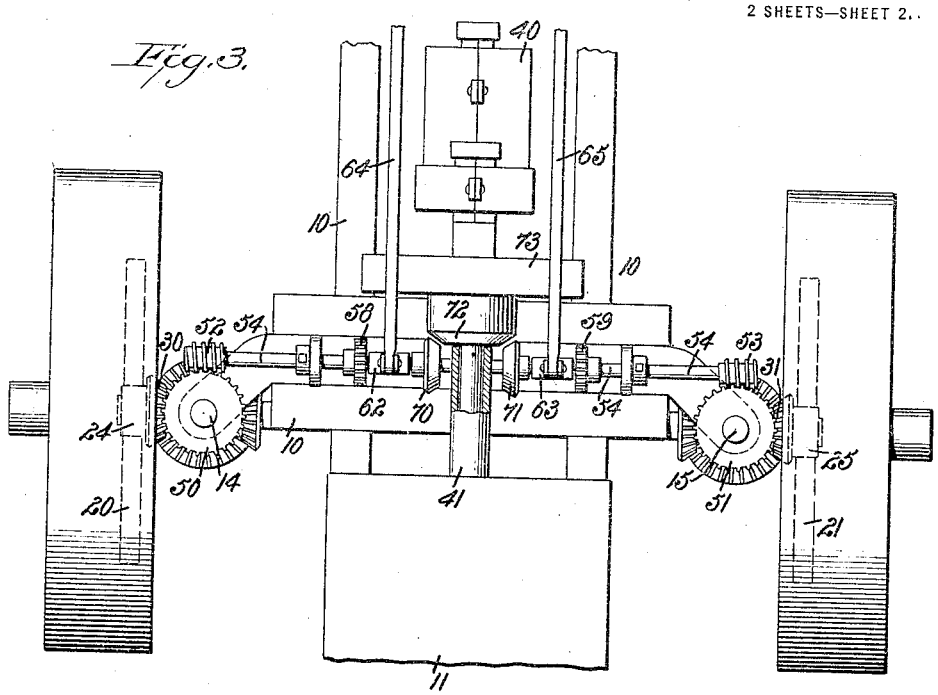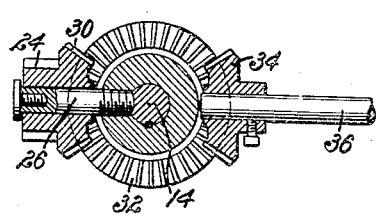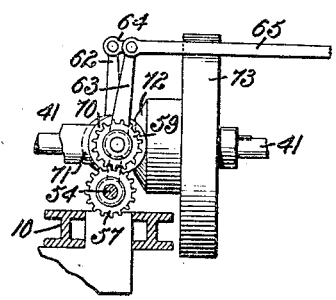

UNITED STATES PATENT OFFICE.

HOMER C. HARTLINE, OF COBDEN, ILLINOIS.

TRACTOR.

1,245,715.  Specification of Letters Patent.  Patented Nov. 6, 1917.

Application filed May 25, 1916. Serial No. 99,755.

*To all whom it may concern:*

Be it known that I, HOMER C. HARTLINE, a citizen of the United States, and a resident of Cobden, in the county of Union and State of Illinois, have invented a new and Improved Tractor, of which the following is a full, clear, and exact description.

The object of the invention is to provide a new and improved tractor designed for hauling threshing machines, wagons and other vehicles, or for drawing plows and other farm machinery over the fields, and arranged to permit of conveniently and quickly steering the tractor or turning it around in a comparatively small space.

In order to accomplish the desired result use is made of traction wheels provided with gear wheels and mounted to turn on axles having upwardly extending shafts or spindles, studs mounted on the said axle shafts, pinions in mesh with the said gear wheels on the traction wheels and mounted to turn on studs attached to the said axle shafts to turn with the same, bevel pinions rotating with the said first-named pinions and in mesh with bevel gear wheels mounted to rotate loosely on the axle shaft, and a transverse driven shaft provided with bevel pinions in mesh with said loose bevel gear wheels. Use is also made of a connection with the axle shafts to turn the same in unison in either direction, a worm wheel on each of the axle shafts and each in mesh with a worm secured on a steering shaft adapted to be connected with a friction drive to turn the axle shafts in either direction.

A practical embodiment of the invention is represented in the accompanying drawings forming a part of this specification, in which similar characters of reference indicate corresponding parts in all the views.

Fig. 3 is a plan view of the same;

Fig. 4 is an enlarged sectional plan view of the driving gear for a traction wheel and steering axle; and Fig. 5 is a sectional side elevation of a portion of the steering gear with one of the friction pinions in engagement with the friction driving wheel.

Figure 1:
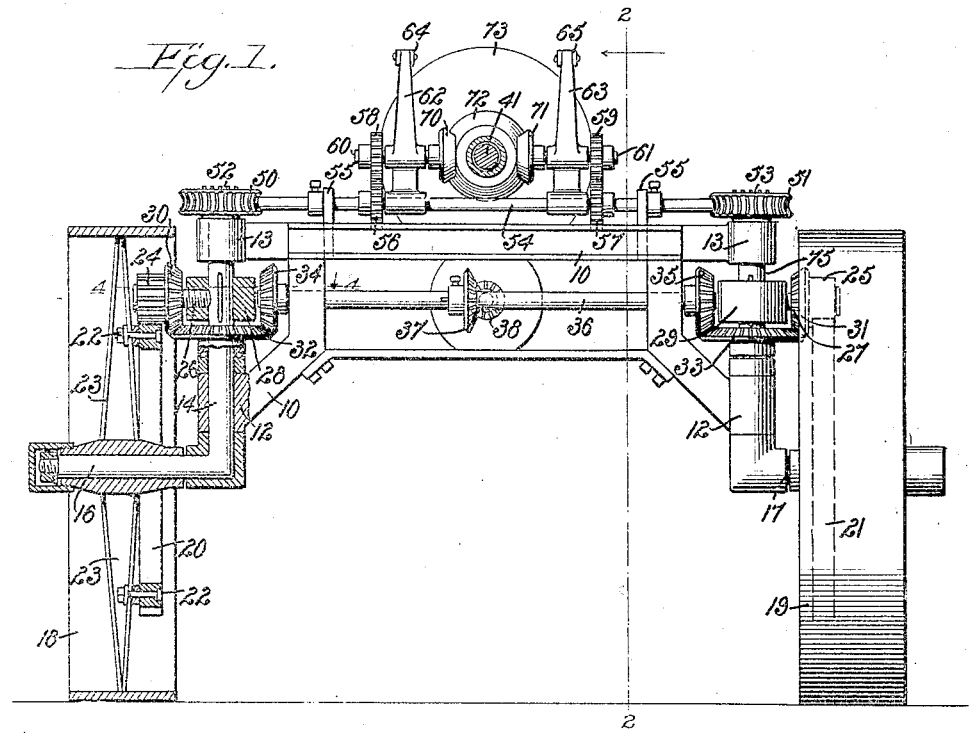
Figure 1 is a front elevation of the tractor with parts in section.
Figure 2:
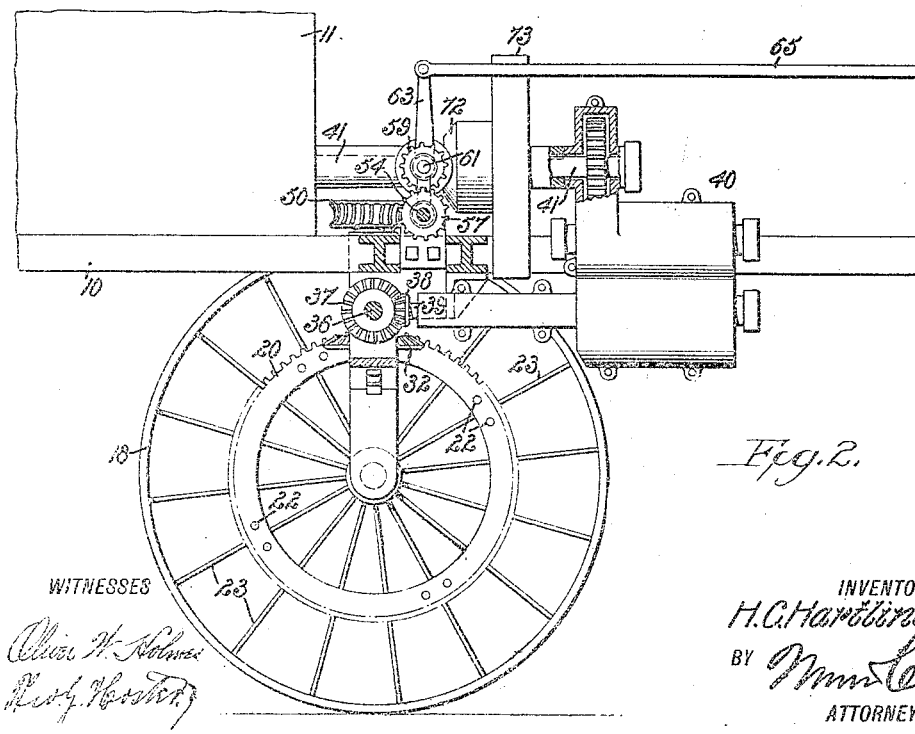
Fig. 2 is a sectional side elevation of the same on the line 2—2 of Fig. 1.

The frame 10 of the tractor is connected with or forms part of the vehicle carrying a suitable motor 11. The frame 10 is provided at the sides with pairs of spaced bearings 12 and 13, arranged one above the other, and in which are journaled the upright shafts or spindles 14 and 15, from the lower ends of which extend axles 16 and 17 for the traction wheels 18 and 19 to turn on.

The traction wheels 18 and 19 are provided with gear wheels 20 and 21, preferably in the form of spur wheels fastened by cleats or other suitable fastening devices 22 to the spokes 23 of the traction wheels 18 and 19. The gear wheels 20 and 21 are in mesh with pinions 24, 25 journaled loosely on studs 26, 27, screwed in or otherwise attached to collars 28, 29, keyed or otherwise fastened to the axle shafts or spindles 14 and 15. On the pinions 24 and 25 are secured or formed bevel gear wheels 30, 31 in mesh with bevel gear wheels 32, 33 mounted to rotate loosely on the axle shafts or spindles 14 and 15. The bevel gear wheels 32, 33 are in mesh with bevel gear wheels 34, 35 secured on the ends of a transversely extending shaft 36 journaled in suitable bearings 47 attached to or forming part of the frame 10. On the transverse shaft 36 is secured a bevel gear wheel 37 in mesh with a bevel pinion 38 attached to a shaft 39 forming part of the usual speed gearing 40 driven from the shaft 41 of the motor 11, so that when the motor is running a rotary motion is given to the shaft 36. The rotary motion of the shaft 36 is transmitted by the bevel pinions 34, 35 to the bevel gear wheels 32, 33 to rotate the bevel pinions 30, 31 and the pinions 24, 25 in mesh with the gear wheels 20 and 21, so that a rotary motion is given to both traction wheels 18 and 19 to propel the tractor forward or backward according to the direction in which the motor 11 is running at the time.

On the upper ends of the axle shafts 14 and 15 are secured worm wheels 50 and 51 in mesh with worms 52, 53 secured on a transversely extending shaft 54 journaled in suitable bearings 55 attached to or forming part of the main frame 10. On the shaft 54 are secured gear wheels 56, 57 in mesh with gear wheels 58, 59 secured on shafts 60 and 61 journaled in levers 62, 63 mounted to swing loosely on the shaft 54 as the fulcrum. The levers 62, 63 are connected by links 64, 65 with the steering mechanism under the control of the operator to impart a swinging motion to either of the levers 62, 63 whenever it is desired to steer the tractor to the right or to the left, as hereinafter more fully explained. On the shafts 60 and 61 are secured the friction pinions 70, 71 normally out of mesh with a friction drive wheel 72 secured on the motor shaft 41. The friction drive wheel 72 is preferably formed on the fly wheel 73, as indicated in the drawings but it may be independently fastened to the motor shaft 41. When it is desired to steer the tractor to the right or to the left then a swinging movement is given to the corresponding lever 62 or 63 to move the friction pinion 70 or 71 in engagement with the friction drive wheel 72 driven by the motor 11. The rotary motion of this friction drive wheel 72 is transmitted to the corresponding friction pinion 70 or 71 to rotate the shaft 60 or 61 and with it the gear wheel 58 or 59 in mesh with the gear wheels 56, 57 secured on the shaft 54. Thus the shaft 54 is driven in either direction according to which of the pinions 70 or 71 is in mesh with the friction drive wheel 72 at the time, and the rotary motion of the shaft 54 is transmitted by the worms 52, 53 to the worm wheels 50, 51 to rotate the latter in unison and thus turn the axle shafts or spindles 14, 15 in unison to direct the driven traction wheels 18 and 19 either to the right or to the left according to the direction in which the shaft 54 is driven at the time. It will be noticed that the traction wheels 18 and 19 can be given practically a right angled position to the one when running straight forward or backward so that the tractor can be turned around in a comparatively small space.

It is expressly understood that the motor 11 is used both for propelling the traction wheels 18 and 19 and for swinging the same either to the right or to the left whenever the corresponding lever 62 or 63 is actuated by the operator in charge of the tractor.

The tractor shown and described is very simple and durable in construction and can be cheaply manufactured and on account of being composed of comparatively few parts is not liable easily to get out of order.

Having thus described my invention, I claim as new and desire to secure by Letters Patent:—

1. In a tractor, the combination of a motor, traction wheels provided with gear wheels, axles on which the said traction wheels are journaled, the axles having integral upwardly extending shafts, a gearing carried by the axle shafts and in engagement with the said gear wheels on the traction wheels to positively turn the latter, means for operating the gearing from the motor, a steering mechanism, and gearing between the steering mechanism and the upper ends of the axle shafts.

2. In a tractor, the combination of traction wheels provided with gear wheels, axles on which the traction wheels are mounted, the axles having upwardly extending shafts at their inner ends, gear wheels loosely mounted on the shafts of the axles, loosely mounted gear wheels carried by the shafts of the axles and meshing with the gear wheels of the traction wheels, said gear wheels carrying gear wheels meshing with the gear wheels of the axle shafts, and means for operating the last-named gear wheels.

3. In a tractor, the combination of traction wheels provided with gear wheels, axles on which the traction wheels are journaled, the axles having integral upwardly extending shafts, pinions in mesh with the said traction wheel gear wheels, bevel pinions rotating with the said first-named pinions, studs mounted on the said axle shafts and on which said pinions are mounted to turn loosely, and driven bevel gear wheels loose on the said axle shafts and in mesh with the said bevel pinions.

4. In a tractor, the combination of traction wheels provided with gear wheels, axles on which the said traction wheels are journaled, the axles having integral upwardly extending shafts, pinions in mesh with the said traction wheel gear wheels, bevel pinions rotating with the said first-named pinions, studs mounted on the said axle shafts and on which said pinions are mounted to turn loosely, bevel gear wheels loosely mounted on the axle shafts and meshing with the said bevel pinions, and a transverse driven shaft provided with bevel pinions in mesh with the said bevel gear wheels.

5. In a tractor, wheels provided with gear wheels, axles on which the wheels are mounted, the axles having upwardly projecting shafts, beveled gear wheels loose on the axle shafts, loosely mounted pinions carried by the axle shaft and meshing with the gear wheels of the traction wheels, said pinions carrying beveled gear wheels meshing with the beveled wheels of the axle shafts, means for operating the loosely mounted beveled gear wheels of the axle shafts, worm wheels on the upper ends of the axle shafts, a shaft having worms engaging the said worm wheels, and means for operating the shaft having the worms.

HOMER C. HARTLINE.